United States Patent [19]

Israel

[11] Patent Number: 4,597,075
[45] Date of Patent: Jun. 24, 1986

[54] MODULAR SWITCHING NETWORK FOR TELECOMMUNICATION SYSTEM

[75] Inventor: John W. Israel, Dallas, Tex.

[73] Assignee: Italtel-Societa Italiana Telecomunicazioni S.p.A., Milan, Italy

[21] Appl. No.: 744,129

[22] Filed: Jun. 12, 1985

Related U.S. Application Data

[63] Continuation-in-part of Ser. No. 743,866, Jun. 11, 1985, which is a continuation of Ser. No. 403,706, Jul. 30, 1982, abandoned, which is a continuation-in-part of Ser. No. 295,145, Aug. 21, 1981, abandoned.

[51] Int. Cl.$^4$ .............................................. H04Q 11/04
[52] U.S. Cl. ............................................................. 370/58
[58] Field of Search ................... 370/58, 59, 63, 64, 370/67, 85, 94

[56] References Cited

U.S. PATENT DOCUMENTS

| | | | |
|---|---|---|---|
| 3,560,663 | 2/1971 | Lee et al. | 179/18 |
| 3,564,499 | 2/1971 | Ryan | 340/147 |
| 3,629,511 | 12/1971 | Wolf | 179/18 |
| 3,678,205 | 7/1972 | Cohen et al. | 370/66 |
| 3,705,523 | 12/1972 | Alouisa | 179/18 |
| 3,814,839 | 6/1974 | Lubarsky, Jr. et al. | 178/2 |
| 3,814,840 | 6/1974 | Lubarsky, Jr. et al. | 178/2 |
| 3,838,226 | 9/1974 | Warman et al. | 179/18 |
| 3,993,873 | 11/1976 | Bogda et al. | 179/18 |
| 4,081,612 | 3/1978 | Hafner | 179/15 |
| 4,168,400 | 9/1979 | de Cousanon et al. | 179/15 |
| 4,228,536 | 10/1980 | Gveldenpfennig et al. | 370/66 |
| 4,262,357 | 4/1981 | Shima | 370/85 |
| 4,316,283 | 2/1982 | Ulug | 370/66 |
| 4,332,026 | 5/1982 | Alvarez, III et al. | 370/66 |
| 4,340,960 | 7/1982 | Moran | 370/67 |
| 4,347,498 | 8/1982 | Lee et al. | 370/94 |
| 4,370,743 | 1/1983 | Moran | 370/67 |
| 4,425,640 | 1/1984 | Philip et al. | 370/58 |

*Primary Examiner*—Douglas W. Olms
*Assistant Examiner*—Kenneth I. Rokoff
*Attorney, Agent, or Firm*—Karl F. Ross; Herbert Dubno

[57] ABSTRACT

A plurality of routing modules in a switching network of a telecommunication system each includes several interfaces connected to a first channel concentrator via respective data stores receiving and temporarily memorizing incoming data words coding the voltage levels of message samples from associated peripheral units served by the respective interface. In response to commands from a control unit, included in the module, this first concentrator selectively transmits memorized data words in respective phases of a PCM frame to all the modules in the network. Outgoing data words issuing from any routing module are registered in other data stores and selectively extracted therefrom by a second channel concentrator under instructions from the control unit, the extracted data words being distributed by a channel expander commanded by the control unit to registers assigned to respective peripheral units. The contents of these latter registers are read in a predetermined sequence to the interfaces for transmission to the peripheral units in response to instructions generated by the control unit. A PCM frame has 32 time slots of 8 phases each, the maximum number of peripheral units served by each interface being equal to the number of phases per PCM frame, i.e. 256. A conference bridge may be provided in each module for the implementation of multiparty calls between telephone subscribers.

7 Claims, 14 Drawing Figures

SOFTWARE COMPONENTS FOR MCP SYSTEM

INPUT CONTROLLER

PROCESS SELECTOR

OUTPUT CONTROLLER

MODULAR SWITCHING NETWORK FOR TELECOMMUNICATION SYSTEM

CROSS REFERENCE TO RELATED APPLICATIONS

This is a continuation-in-part of my copending U.S. patent application Ser. No. 743,866 filed June 11, 1985, which in its turns is a continuation of my U.S. patent application Ser. No. 403,706 filed July 30, 1982, now abandoned, which in its turn is a continuation-in-part of my U.S. patent application Ser. No. 295,145 filed Aug. 21, 1981, now abandoned.

FIELD OF THE INVENTION

My present invention relates to a switching network adapted to facilitate selective message transmission among a multiplicity of peripheral units, such as subscriber stations or trunk lines, with the aid of signal-routing modules serving as automatic exchanges in a telephone or other telecommunication system.

BACKGROUND OF THE INVENTION

In such automatic exchanges it is known to provide routing modules, e.g. in the form of orthogonal switching matrices, responsive to instructions from associated control units which in turn may be commanded by a central controller. As a given switching matrix serves only a limited number of peripheral units, the several matrices must be able to intercommunicate in order to establish signal paths between stations respectively served thereby. This creates problems when the network must be expanded to accomodate additional subscribers and/or to provide for a greater variety of available services.

OBJECT OF THE INVENTION

The object of my present invention, therefore, is to provide a network of this type which has the flexibility and adaptability required for expansion and/or service modification in a relatively simple and economical manner.

SUMMARY OF THE INVENTION

In accordance with my present invention, each of several signal-routing modules of a switching network for a telecommunication system has a set of input/output terminals connected to respective peripheral units of a group individually associated therewith. Each module comprises a control unit as well as a plurality of interfaces which are each connected, via corresponding subsets of the set of terminals, to a plurality of peripheral units in a respective subgroup of the associated group. Each interface includes first register means for temporarily storing incoming data words of m bits each (m being preferably equal to 8, in conformity with the usual practice) which represent message samples of PCM channels received from the associated subgroup of peripheral units in respective time slots of an operating cycle; such a cycle coincides with a recurrent PCM frame which is divided into a multiplicity of phases, each time slot encompassing m phases. A first channel concentrator in each module has input connections to the first register means of all interfaces thereof and has a reduced number of outputs carrying in each phase the bits of an incoming data word selectively extracted therefrom on instructions from the control unit. A second channel concentrator in each module has input connections to the second register means and has a reduced number of outputs carrying in each phase the bits of an outgoing data word extracted therefrom also in response to instructions from the control unit. Each interface further includes third register means for temporarily storing outgoing data words destined for the peripheral units in the associated subgroup, these outgoing data words being selectively fed thereto by distributing means inserted between the second channel concentrator and the several interfaces. The feeding of the outgoing data words to the third register means and thence to designated peripheral units of the associated subgroup takes place under instructions from the control unit delivered to the distributing means and to the third register means.

Pursuant to a more particular feature of my invention, the distributing means may comprise a channel expander (roughly complementary to the first channel concentrator) and a plurality of data stores in which the expander enters outgoing data words destinated for any of the interfaces of the module concerned.

In the network particularly described hereinafter, each peripheral unit is linked with an interface terminal of the associated module through a bidirectional connection (e.g. a telephone line or a trunk). In principle, however, my invention is also applicable to systems in which incoming data words are received only from some peripheral units acting as sources while outgoing data words are sent to other peripheral units acting as loads.

Advantageously, the number of peripheral units served by each interface of a routing module does not exceed the number of phases in a PCM frame; with the usual number of 32 time slots per frame, the maximum number of peripheral units in each subgroup is thus 256. This will insure that under certain operating conditions, when all the peripheral units associated with a single interface of a module are active while the others are not, the data words or bytes received from all these active peripheral units will pass at least the first channel concentrator.

In the specific embodiment here disclosed, each module has eight interfaces accommodating up to 2,048 peripheral units. With the first concentrator of each routing module handling a maximum of 256 PCM channels, this allows for the establishment of simultaneous signal paths between up to 25% of all peripheral units served by the network, provided they are well distributed among the groups associated with the several modules. If necessary, of course, the maximum ratio of the number of simultaneous active peripheral units to the total number thereof can be increased by doubling or otherwise enlarging the output capacity of the two channel concentrators of one or more modules.

In a telephone system or the like, the control unit of any module will generally emit routing instructions on the basis of call signals received from an associated station and conveyed to the control unit of a module serving a called station (if the two modules are different) via the intermodule connection available for the transmission of data words. In some systems, however, these control units could also be commanded by a centralized higher-ranking controller to establish and terminate connections between specified peripheral units, e.g. in accordance with a predetermined program.

BRIEF DESCRIPTION OF THE DRAWING

The above and other features of my present invention will now be described in detail with reference to the accompanying drawing in which.

SPECIFIC DESCRIPTION

Figure 1:
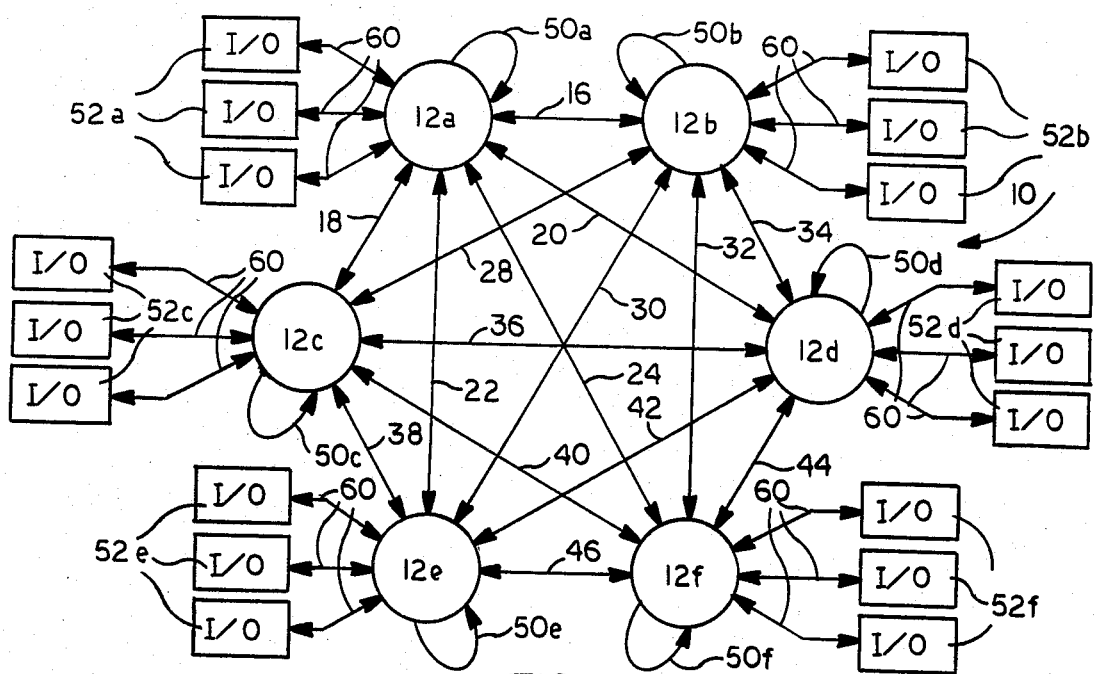
FIG. 1 is a block diagram of a switching network according to my present invention including a plurality of structurally identical routing modules.

As illustrated in FIG. 1, a switching network according to my present invention comprises a plurality of signal-routing modules 12a, 12b ... 12f interconnected in a full-mesh mode. Module 12a is connected to modules 12b, 12c ... 12f via respective bidirectional signal paths 16, 18, 20, 22, 24. Module 12b is directly linked to modules 12c, 12d, 12e and 12f via bidirectional paths 28, 34, 30 and 32, respectively. Module 12c communicates with modules 12d, 12e and 12f via paths 36, 38 and 40. Similar transmission paths 42 and 44 couple the modules 12e and 12f to module 12d while modules 12e and 12f communicate via a bidirectional path 46 with each other. Thus, each module in the telecommunication system of FIG. 1 exchanges information with all the other modules of the network.

Each module 12a, 12b ... 12f is also provided with a respective feedback loop 50a, 50b ... 50f on which it receives back some of the data words and routing information emitted by it. As described hereinafter with reference to FIG. 2, the feedback loops 50a, 50b ... 50f enable the establishment of a signal path between two peripheral units connected to the same module.

Each module of FIG. 1 is further tied via a number of bidirectional multiples 60 to a respective group of associated peripheral units 52a, 52b ... 52f. These peripheral units may be telephones, teletypewriters, video displays, data processors, PCM trunk lines or the like; the information being carried by multiples 60 is assumed to be in analog form though this need not be the case. The full-mesh interconnection of switching modules 12a, 12b ... 12f enables any peripheral unit in the system to communicate with any other such unit in the network. The designation I/O of units 52a–52f indicates that they act as the input/output ports of the overall system.

The modular design of a switching network according to my present invention facilitates the addition of peripheral units that are geographically remote from the pre-existing peripheral units thereof. Any such remote peripheral units can be connected to the network through an additional routing module in turn tied to each of the existing modules via a respective bidirectional communication path.

Figure 2:
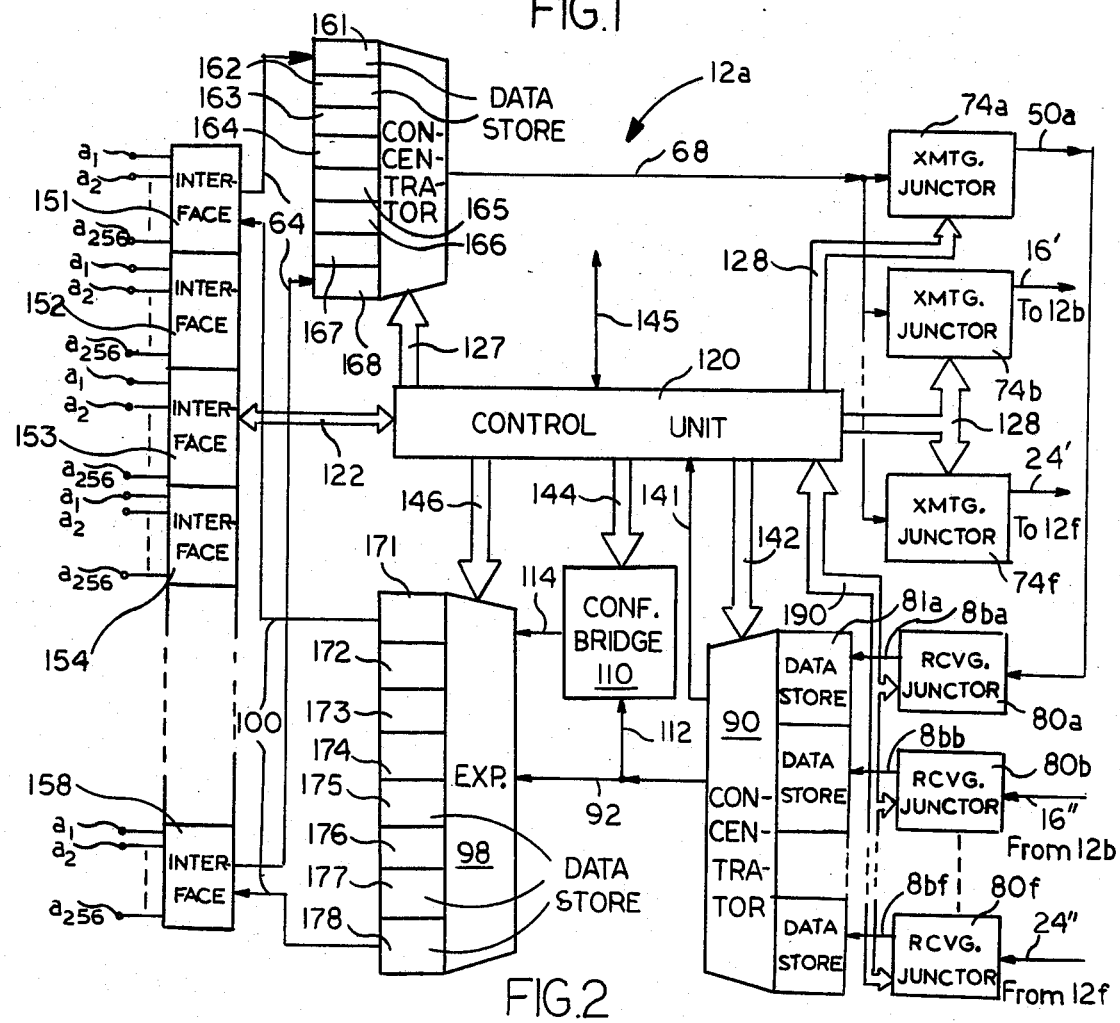
FIG. 2 is a block diagram of one of the routing modules of FIG. 1, showing several structurally identical input/output interfaces.

As particularly illustrated in FIG. 2 for routing module 12a, each module includes eight interfaces 151–158 with up to 256 terminals $a_1$–$a_{256}$ connected at least in part to respective peripheral units. These interfaces have output multiples 64 (only two shown) extending to respective data stores 161–168. Each of these data stores comprises 256 pairs of 20-bit registers, the registers of each pair being alternately enabled by timing signals from a control unit 120 to load 20-bit data words carried in corresponding phases of consecutive recurrences of an incoming PCM frame.

Data stores 161–168 are linked to a channel concentrator or compressor 66 (essentially a PCM multiplexer) which, in response to instructions received from control unit 120 via a bus 127, selectively reads out the contents of their registers onto a 20-lead output multiple 68. This multiple extends to a plurality of transmitting junctors 74a, 74b ... 74f, one for each routing module 12a, 12b ... 12f, conventionally designed as line drivers. Feedback loop 50a serves as an output multiple of junctor 74a whereas junctors 74b–74f have output multiples 16', 18', 20', 22', 24' respectively included in the bidirectional signal paths 16, 18, 20, 22, 24 of FIG. 1. The junctors 74 are operatively tied via buses 128 to control unit 120 for receiving therefrom instructions to be transmitted to all the modules of the network. The control unit 120 also communicates with interfaces 151–158 by way of a bidirectional bus 122.

Module 12a further incorporates a plurality of receiving junctors 80a, 80b ... 80f, i.e. conventional line receiver, respectively assigned to all the modules 12a–12f. Junctor 80a is connected to transmitting junctor 74a via feedback loop 50a whereas junctors 80b–80f receive signals from modules 12b–12f via multiples 16" ... 24", also included in bidirectional signal paths 16 ... 24, respectively. Receiving junctors 80a–80f have respective output multiplex 86a–86f working into data stores 81a–81f each advantageously comprising 257 pairs of registers, the registers of 256 of these pairs each having 20 stages for the memorization of 20-bit data words arriving from the several modules over feedback loop 50a and bidirectional signal paths 16, 18, 20, 22, 24 via receiving junctors 80a–80f.

Data stores 81a–81f are connected to a channel concentrator 90 also designed as a PCM multiplexer. In response to commands from control unit 120, concentrator 90 selectively transmits onto a 20-lead multiple 92 data words written in the registers of stores 81a–81f. During each frame period, i.e. during a time interval coinciding with the transmission of an incoming PCM frame by concentrator 66 or with the reception of an outgoing PCM frame by any junctor 80a–80f, concentrator 90 selects 256 data words from among the 6×257 words registered in stores 81a–81f and emits the selected words in successive phases of an outgoing PCM frame; in particular, the concentrator 90 selects data words destinated to the relevant module 12. The selected data words are conveyed to a channel expander 98 (essentially a PCM demultiplexer) via a multiple 92 and to a conference bridge 110 via a ranch 112 of that multiple. Reference in this connection may be made, for example to U.S. Pat. No. 4,190.742. As described in greater detail hereinafter, conference bridge 110 facilitates multiparty telephone calls among subscriber stations represented by the peripheral units of FIG. 1; bridge 110 transmits output signals to expander 98 via a data multiple 114 in response to instructions received from control unit 120 on a command bus 144. A two-way connection 145 links the control unit 120 with a central controller (not shown) for the performance of ancillary operations such as data storage, error detection and man/machine dialoguing.

Channel expander 98 is connected on its output side to eight data stores 171-178 which have output multiples 100 (only two shown in FIG. 2) extending to respective switching interfaces 151-158. In accordance with switching commands received from control unit 120 via a bus 146, expander 98 loads signals arriving over multiples 92 and 114 into selected registers of data stores 171-178. Each of these stores includes 256 register pairs assigned to respective peripheral units served by one of the eight interfaces. The registers of each pair assigned to a peripheral unit communicating with another peripheral unit are alternately enabled by recurrent timing signals from the control unit 120 to load 20-bit data words carried in a corresponding phase of consecutive recurrences of an outgoing PCM frame. Data-receiving registers of up to 256 pairs selected by expander 98 in accordance with the commands from control unit 120 are loaded with data words during any given frame period while corresponding registers of nonselected pairs do not receive any data. During the succeeding frame period the previously loaded registers of each selected data store 171-178 are enabled in a pre-established sequence to read their contents onto the associated output multiple 100, as described in detail hereinafter with reference to FIG. 5C.

Figure 3:
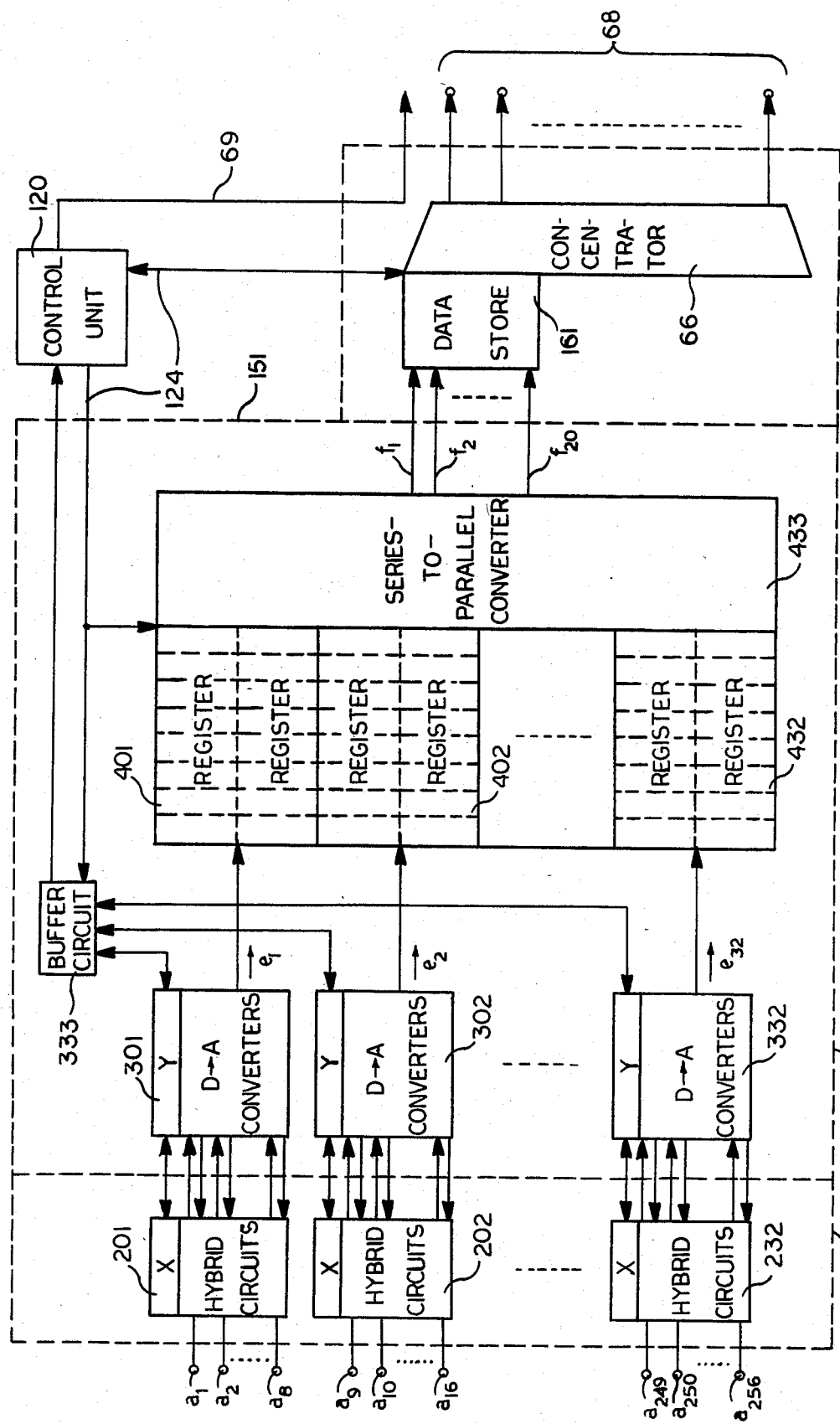
FIG. 3 is a block diagram of a first part of an interface of FIG. 2, designed for the handling of incoming data words.
Figure 4:
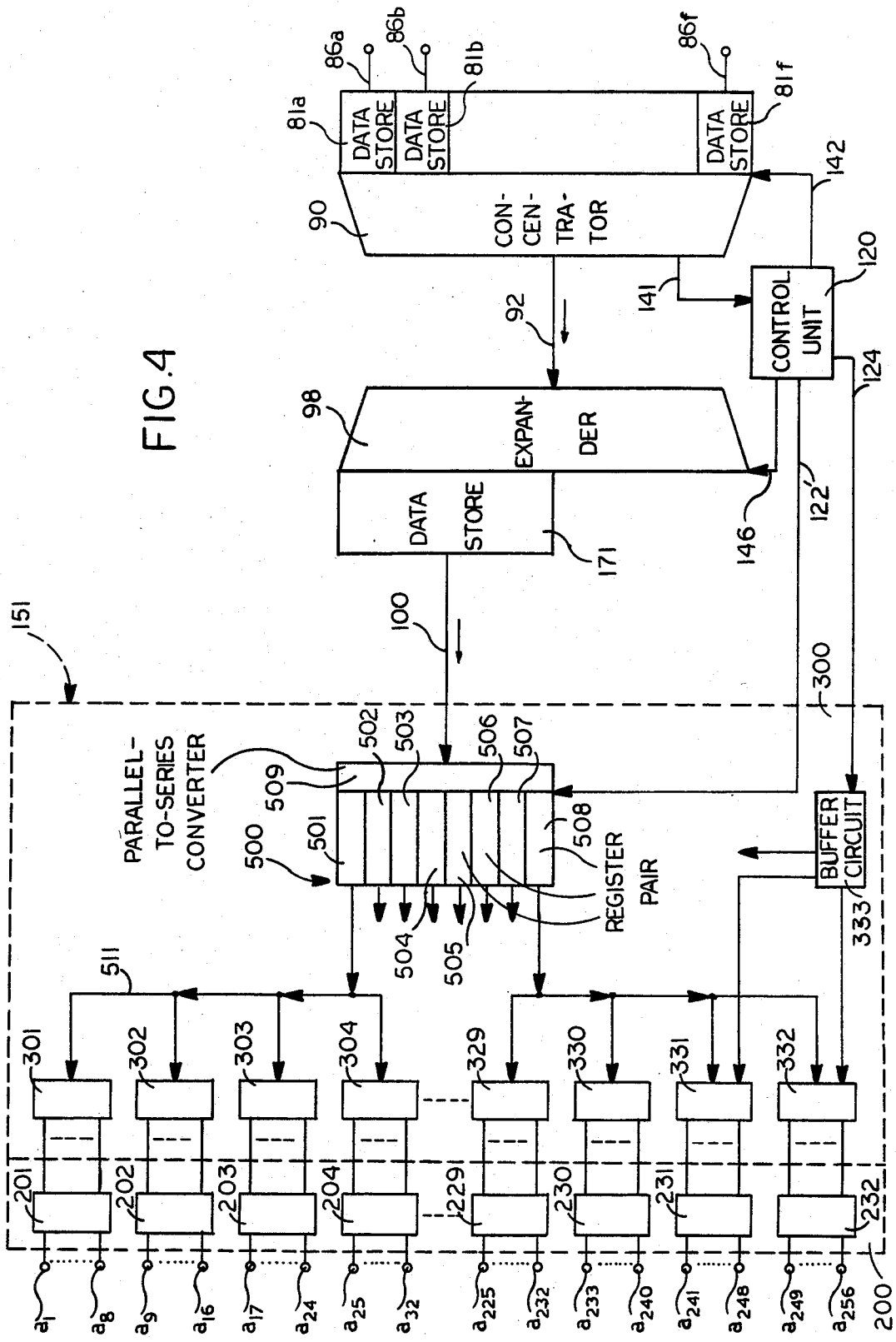
FIG. 4 is a block diagram of the second part of the interface illustrated in FIGS. 2 and 3, designed for the handling of outgoing data words.

As illustrated in FIGS. 3 and 4, interface 151—which is structurally identical with interfaces 152-158—comprises a first section 200 connected to 256 peripheral units out of an assumed total of 2,048 such units associated with module 12a. A second section 300 of interface 151 is disposed between section 200 and the other components of module 12a, particularly the associated data stores 161 and 171. Section 200 includes 32 input/output ports 201-232 each tied to eight peripheral units of the associated subgroup. Ports 201-232 comprise hybrid circuits for performing the one-way/two-way conversion necessary where a bidirectional subscriber line is coupled to a digital switching module whose internal connections carry signals in one direction only. Each port 201-232 is provided with a sensing circuit x which scans the associated subscriber line for detecting a signal indicating an attempt to establish a calling connection; this information is transmitted to control unit 120 which responds thereto as described hereinafter. Where the peripheral units 52 are conventional telephones, such a signal indicates an off-hook condition of a telephone handset. The release of a line is similarly reported to the control unit. The circuits implemented in the ports 201-232 are known in the art: reference in this connection can be made, for example, to U.S. Pat. No. 4,435,619.

Section 300 includes 32 sets of 8 transcoders 301-332 respectively connected to the input/output ports 201-232 for digitizing incoming analog signals (e.g. voice samples) and for converting into analog form digital signals outcoming from buffer component 500 of FIG. 4. Ports 201-232 may be adapted to transform incoming analog voltages into waveforms having voltage levels suitable for digitization by the analog-to-digital converters of these transcorders.

The transcoders 301-332 may incorporate signal generators which emit ringing signals to called peripheral units and ringing, dial or busy tones to calling peripheral units by way of the hybrid circuits of ports 201-232, the signal generators being activated in response to commands transmitted from control unit 120 over a buffer circuit 333 and logic circuits y included in the transcoders. Alternatively, the signal generators may be included in these hybrid circuits and activated by the sensing circuits x which are coupled to the respective logic circuits y.

Figure 5A:
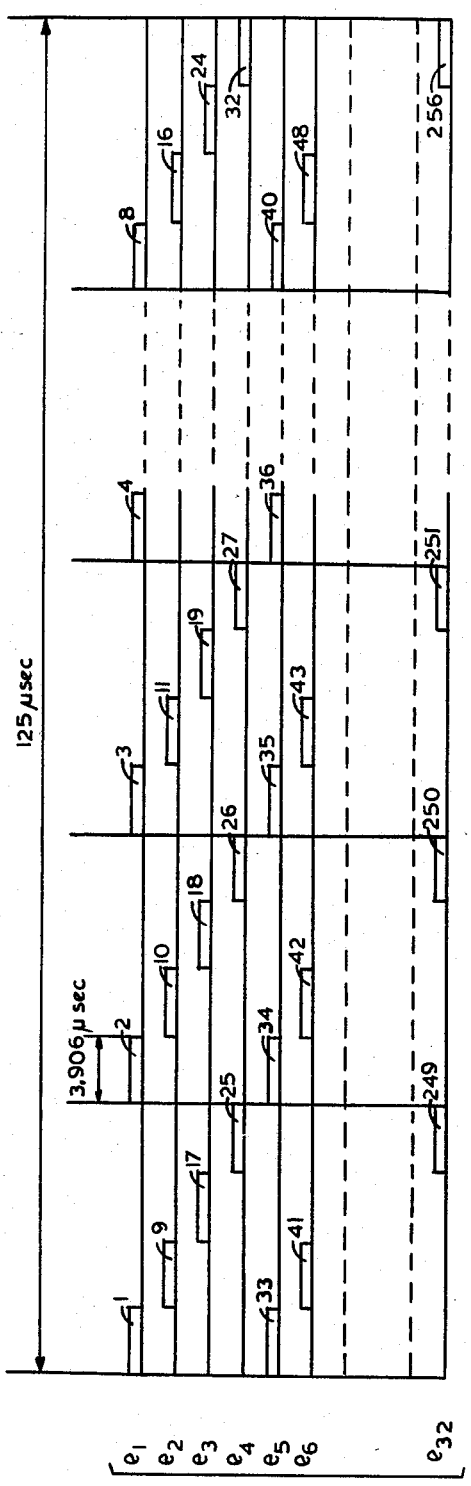
FIGS. 5A and 5B are two time diagrams relating to the processing of incoming data words by the interface components illustrated in FIG. 3.

According to a possible form of implementation, the logic circuit y comprises a commercially available microprocessor which is monitored by the control unit 120 and handles routine functions. For this purpose the control unit 120 write in a memory connected to the microprocessor messages which:

give instructions to the microprocessor to send data words coming from port 201-232 toward the relevant register 401-432, in compliance with the time-diagrams of FIG. 5A;

enable the associated converter 301-332 to send to the subscribers connected to the port 201-232 analog signals which correspond to digital ones, if any, stored in the pertaining register pair 501-508.

In response to commands from control unit 120, each logic circuit y controls the pertinent set of 8 transcoders for analog/digital conversion of signals arriving from the eight associated peripheral units via the intervening group of eight input/output ports. The bits of incoming data words (bytes) serially emitted on transcoder outputs $e_1$-$e_{32}$ are fed to respective pairs 401-432 of 8-bit registers.

As illustrated in rows $e_1$-$e_{32}$ of FIG. 5A, data words (labeled 1-256 according to the originating terminals $a_1$-$a_{256}$) are transmitted from transcoder circuits 301-332 to register pairs 401-432 in a 125-microsecond operating cycle (corresponding to a PCM frame) subdivided into eight subcycles each having a duration of 15.625 microseconds. Each transcoder emits one 8-bit word or byte during each subcycle. However, the emission times are staggered so that eight preselected transcoders of set 301, 305, 309, 313, 317, 321, 325 and 329 emit their bytes during a first time slot of each subcycle, eight other transcoders 302, 306, 310, 314, 318, 322, 326 and 330 of the set do so during a second time slot, eight further transcoders 303, 307 etc. utilize a third time slot and the remaining eight transcoders 304, 308 etc. are active during a fourth time slot; each time slot is approximately 3.906 microseconds in duration.

As further illustrated in FIG. 3, register pairs 401-432 are connected to a series-to-parallel converter 433 which transmits to data store 161 during each time slot of an operating cycle the information received by eight of these registers during the immediately preceding time slot. Converter 433 is also designed to append a 12-bit error-correction code to the bytes arriving from transcoders 301-332 via register pairs 401-432. The resulting 20 bits of each data word are emitted over respective leads $f_1$-$f_{20}$ to data store 161. The order in which the information is transmitted is controlled by control unit 120 via bus 124.

Figure 5B:
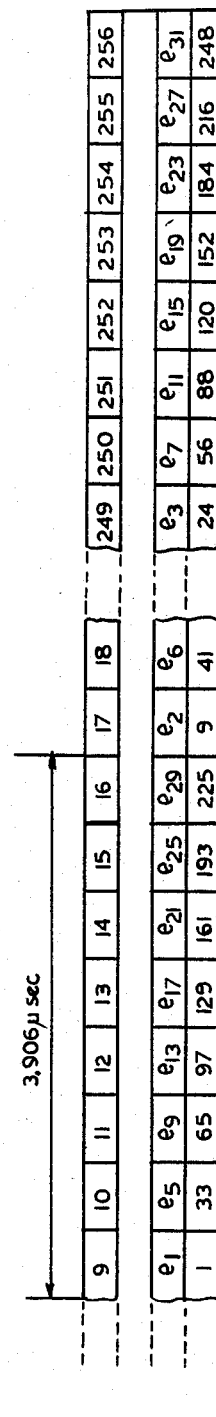

As indicated in graphs e and f of FIG. 5B, each of the 32 time slots of an operating cycle of interface 151 is divided into eight phase during each of which a data word—labeled in graph e as in FIG. 5A—is transmitted in parallel form to a respective register in data store 161 from an associated register in group 401–432. During phases 9–16 corresponding to the second time slot of an operating cycle, graph f, series-to-parallel converter 433 transmits from register pairs 401, 405, 409, 413, 417, 421, 425, 429 the bytes loaded into one register of each pair during the first time slot of the cycle. The first bytes fed by leads $e_2$, $e_6$, $e_{10}$, $e_{14}$, $e_{18}$, $e_{22}$, $e_{26}$, $e_{30}$, into the data-receiving registers of pairs 402, 406, 410, 414, 418, 422, 426, 430 during the second time slot of the first subcycle, as partly illustrated in FIG. 5B, are transferred by converter 433 to data store 161 during the series of phases 17–24 coinciding with the third time slot of a subcycle. Thus, the eight registers of group 401–432 receiving byte sequences from transcoders 301–332 in one time slot of an operating cycles are read out to converter 433 in the succeeding time slot. The operating speed of converter 433 result to be eight times bigger than the receiving speed of registers 401–432.

During the common operating cycle of interfaces 151–158, data stores 161–168 can each receive 256 incoming 20-bit words for temporary memorization by registers thereof activated for reception by control unit 120 which includes a non illustrated time base. Each of these momentarily data-receiving registers is paired with a respective structurally identical 20-bit register which was activated during the preceding operating cycle for receiving a data group from the respective converter 433 in the associated interfaces. During any such operating cycle, the 20 bits of each data word written in each of the 2,048 registers of data stores 161–168 activated for writing during the preceding cycle are selectively unloaded in parallel onto multiple 68 in response to reading commands received from control unit 120 via bus 124. Not more than 256 words, however, may be emitted by concentrator 66 in a PCM frame outgoing over multiple 68; that frame thus includes 256 channels and is contemporaneous with an operating cycle of interfaces 151–158 and data stores 161–168.

As also illustrated in FIG. 3, control unit 120 is provided with an output connection 69 which may be formed as part of bus 128 (FIG. 2). This connection carries instructions regarding the establishment and release of signal paths between pairs of peripheral units 52 (FIG. 1), or among a larger member of peripheral units in the case of conference calls. The output multiples 50a, 16', . . . , 24' of transmitting junctors 74a–74f (see FIG. 2) must therefore each include 20 leads branched off multiple 68 and one or more further leads extending from connection 69; the same number of leads are, of course, required for the input multiples of receiving junctors 80a–80f. Each of the transmitting junctors 74a–74f is composed of 20+1 line drivers as well as each of the receiving junctors 80a–80f is composed of 20+1 receivers: 20 of said line drivers/receivers are required to the transmission/reception of the 20 bytes of the above mentioned digital signals; is therefore necessary a further line driver/receiver to enable the transmission/reception of messages among the control unit 120 belonging to two different modules 12, through a wire of multiple 128 for the transmission and through the wire 141 for the reception.

Moreover, data stores 81a–81f have 257 register pairs each, i.e. 256 register pairs for temporarily memorizing outgoing data words to be emitted on multiple 92 and an additional register pair for storing instruction bits generated by the control unit 120 of a respective module 12a–12f. As shown in FIG. 2, concentrator 90 is provided with an output connection 141 extending to control unit 120 for supplying same with instruction words from all six modules in as many supervisory channels addressed by switching commands fed to multiplexer 90 by control unit 120 via a bus 142.

As shown in FIG. 4, each interface 151–158 incorporates in section 300 the aforementioned buffer component 500 including a parallel-to-series converter 509 inserted between the 20-lead multiple 100, extending from data store 171, and eight pairs 501–508 of 8-stage registers. Register pairs 501–508 are connected via respective output leads 511–518 to respective groups of four set of transcoders in the associated set 301–332.

Data store 171 shown in FIG. 4 contains 256 pairs of 20-stage registers, each such pair being assigned to a respective input/output terminal $a_1$–$a_{256}$ of the hybrid circuits forming part of ports 201–232; obviously, some of these terminals may not be connected to peripheral units. Upon saturation of the network, further modules may be readily added to increase its capacity, e.g. up to 16.

During an operation cycle of routing module 12a, up to 256 outgoing 20-bit data words are extracted by concentrator 90 from selected read-enabled registers of stores 81a–81f and are distributed by expander 98 to respective registers in stores 171–178 in accordance with commands from control unit 120. While expander 98 is loading the write-enabled registers of store 171 with data bits to be sent out, that store delivers to 20-lead multiple 100 the contents of registers, which were activated to receive data during the preceding operating cycle but which are enabled to emit data during the current cycle.

Figure 5C:
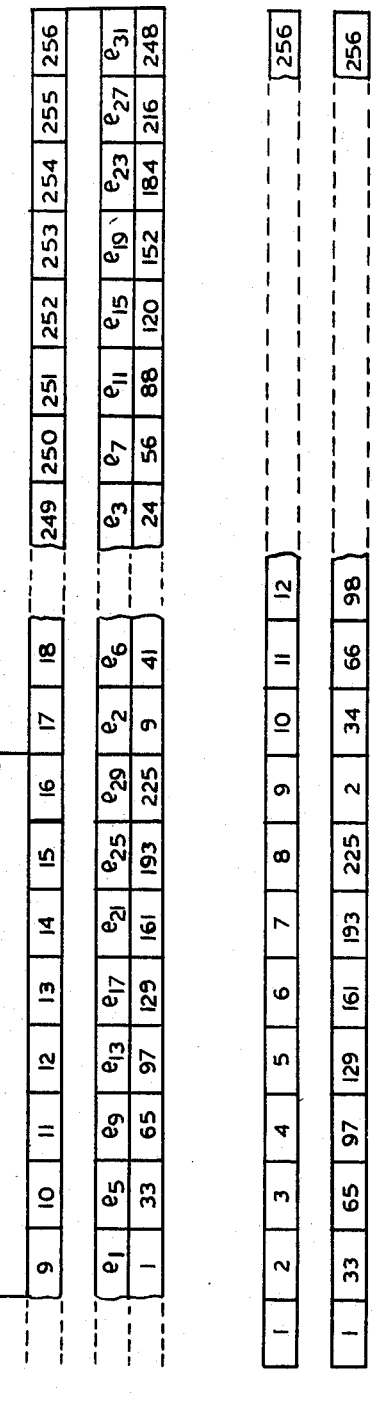
FIG. 5C is a time diagram relating to the processing of outgoing data words by the interface components illustrated in FIG. 4.

Data emission from the read-enabled registers of store 171 to terminals $a_1$–$a_{256}$ of interface 151 proceeds according to graphs a and t of FIG. 5C. An operating cycle of 125 microseconds, corresponding to a PCM frame, is divided into 32 time slots each consisting of eight phases illustrated in graph t. During each time slot, buffer component 500 receives eight 20-bit data words destined for respective transcoder groups 301–304, . . . 329–332. Parallel-to-series converter 509 transforms each arriving 20-bit word into an 8-bit word while simultaneously executing any corrections indicated by the 12-bit error code included in the arriving word. The resulting byte is loaded by converter 509 into a data-receiving register of a pair selected in accordance with the temporal position of the word in an operating cycle, i.e. in accordance with the phase in which the 20-bit word arrived over multiple 100.

As shown in graph a of FIG. 5C, data words arriving in phases Nos. 1–8 constituting the first time slot of an operating cycle are to be ultimately transmitted to peripheral units connected to terminals $a_1$, $a_{33}$, $a_{65}$, $a_{97}$, $a_{129}$, $a_{161}$, $a_{193}$, $a_{225}$, respectively, of interface section 200. During this first time slot the outgoing bytes are loaded in 8-bit from into write-activated registers of respective pairs 501–508. During the next time slot the bits of each byte are serially emitted onto leads 511–518 from register pairs 501–508. The byte destined for the peripheral unit connected to terminal $a_1$ of interface section 201 is transmitted via lead 511 to all the digital/analog converters in transcoders 301–304; control unit 120, however, activates only the corresponding converter of transcoder set 301 via buffer circuit 333 and the logic circuit y of that transcoder set. Analogous routing procedures are used for the bytes emitted onto leads 512-518 from the read-enable register of pairs 502-508.

Figure 6:
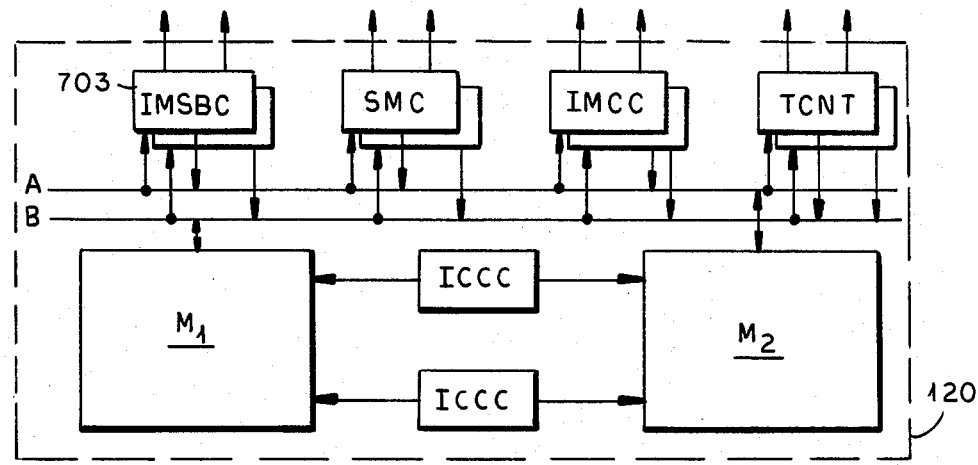
FIG. 6 is a block diagram of the control unit 120 of FIG. 2.

During phases Nos. 9-16 of an operating cycle, i.e. in the course of its second time slot, write-activated registers of pairs 501-508 are fed bytes carrying information ultimately destined for peripheral units connected to terminals $a_2, a_{34}, a_{66}, a_{98}, a_{130}, a_{162}, a_{194}, a_{226}$ of interface section 200. In the 9th phase, even as a 20-bit data word intended for terminal $a_2$ is received in parallel from by converter 509, read-enabled registers of pairs 501-508 emit onto leads 511-518 the first bits of the bytes received during phases Nos. 1-8, respectively. The $2^{nd}$ through $8^{th}$ bits of these previously received bytes are emitted in the phase Nos. 10 through 16, respectively. Thus the bits of data words consecutively transmitted in parallel over multiple 100 in the eight phases of a time slot and transformed into bytes by converter 509 are successively loaded into respective write-activated registers of pairs 501-508, being then concurrently read out in series over respective output leads 511-518 during the succeeding time slot. Data emission from the read-enabled registers of pairs 501-508 is carried out in response to commands generated by control unit 120 on a connection 122' forming part of bus 122 (see FIG. 2). FIG. 6 shows a schematic structure of a possible realisation for the control unit 120, which is composed of some interface circuits and of two standard microprocessors ($M_1$, $M_2$) (for example, LS 11/23 Digital) which operate according to the master-slave principle, can converse between, them, with the other module elements and with the control units 120 of the other modules 12.

The interface circuits (ICCC) which enable the conversation between the microprocessors ($M_1$, $M_2$) and the ones (not in the Figure) which enable the access to A and B buses are normally of standard type and of the same family of such microprocessors; the interface circuit (IMSBC), which allows the conversation with the module's interface units, the interface circuit (IMCC) which enables the conversation with the control units 120 of the other modules 12, the interface circuit (SMC) which converse with the switching systems and the interface circuit (TCNT) which tests and collects the status and alarm signals from the registers of the module, are not always available on the market: for this reason we prefer to give a brief description of the same. The interface circuit IMSBC handles the information exchange among the control units 120 and the interface units 151-158 and in particular with the logic circuits y associated to serie-parallel/parallel-serie 301-332 converters (see FIGS. 3 and 4).

Figure 7:
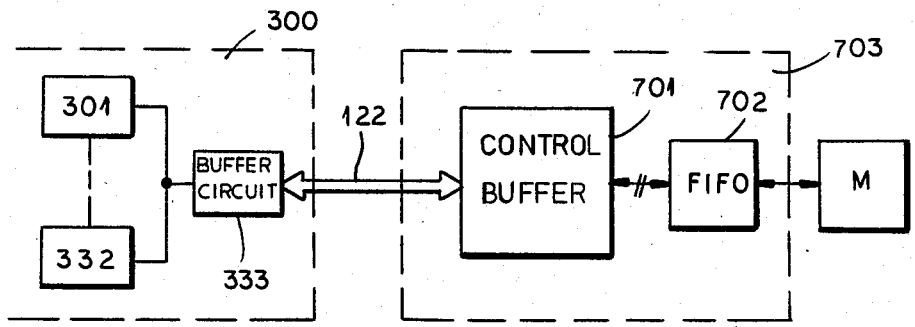
FIGS. 7 and 8 are block diagrams of two of the interface circuits shown in FIG. 6.

The main components of an interface unit IMSBC 703 are schematically described in FIG. 7.

A message coming from one of the converters 301-332 is sent through buffer circuit 333 and bus 122 to the interface circuit IMSBC 703, which is mainly constituted by a control buffer 701 dedicated to the verification of the correct message transmission to the master microprocessor, indicated with M in FIG. 7.

The control buffer 701 controls also the message transmission from the microprocessor M to one of the converters (301-332), following a control procedure similar to the ones described for the conversation between converter-microprocessor.

The significant bits of every message are associated to cyclic redundancy bits: the control buffer 701 identifies in the message in transit the significant bits, calculates the cyclic redundancy bits and makes a comparison with the bits calculated by the transmitting unit (M or converters 301-332) and sent on line together with the message and with the bits calculated by the unit to which the message is addressed (converters 301-332 such as M) and that are sent back to the control buffer 701.

Through the double comparison made by the control buffer 701 it is possible to charge a possible mistake to the transmitting unit or to the line connecting the transmitting unit to the control buffer 701 or to the receiving unit and to the line connecting the receiver unit to the control buffer 701: the diagnosis of the system and the identification of fault equipments are so easier. The mistake would be revealed in any case by the receiving unit comparing the redundancy bits received from the line with the bits locally calculated.

A circuit arrangement fit to handle the functions of the control buffer 701 is already known in the U.S. patent application Ser. No. 417.370, filed in my name on Sept. 13, 1982.

Through the FIFO memory 702 the timing of the control buffer 701 as well as generally the message transmission between a converter (301-332) and the microprocessor (M) and then viceversa are independent from the internal clock of the microprocessor.

The IMCC interface qualified to the "speech" between the control unit 120, to which it is associated, and the interface unit of another module, reduces to the minimum the charge of the CPU units relative to the master microprocessors of both control units actually "speeching". The CPU which has to send a message, places the message complete with the relative final address in a first memory in the interface unit: the IMCC interface decodes the address and informs the module to which the message is addressed that a message is waiting (for example, through a given pre-set polarity on the connecting wire 69—FIG. 3). The IMCC interface of the receiving unit identifies the request and, if free, authorizes the transmission (over the relative wire 69 which connects it to the other module—FIG. 3).

Once received the message, the IMCC interface of the receiving module stores it in a memory and advices its CPU that a message is waiting. A possible realisation of the IMCC interface is represented in the U.S. patent application Ser. No. 417.371 Sept. 13, 1982 in my name. In a preferred arrangement, the control units speech even with a service processor ES, which handles second level administrative, handling, diagnosis and supervision functions: the pertaining CMCC interface unit (FIG. 9) is substantially similar to the IMCC unit and is not therefore represented in FIG. 6.

The SMC interface unit (FIG. 6) is fit for the speech among the master microprocessor and the switching units of the module (multiplexers 66 with relative memories 161-168, multiplexer 90 and relative memories 81a-81f demultiplexer 98 and relative memories 171-178 (FIG. 2) and is mainly constituted of memories, each for every switching devices, consisting of 256 cells, each for every time slots of the PCM systems outgoing from the switching devices: the CPU unit of the master microprocessor ($M_1$ such as $M_2$) writes in these cells the memories addresses (81a-81f; 161-168, 171-178) which are associated to each switching device, from which the same units detect cyclically the time slots that bild up the outgoing PCM.

Figure 8:
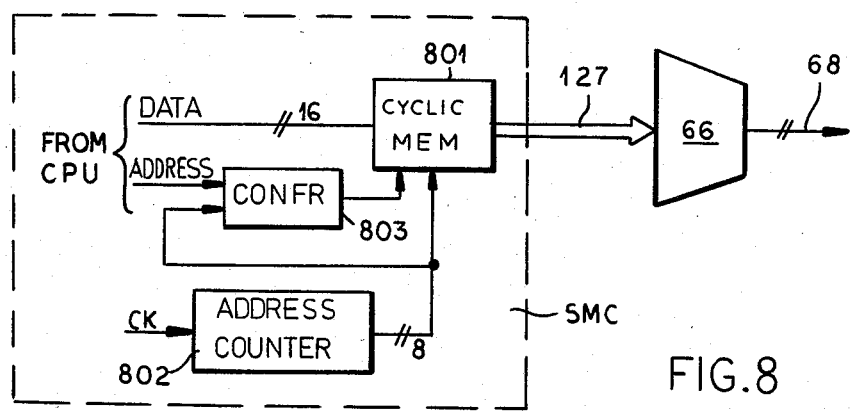

FIG. 8 represents schematically the SMC interface which monitors the multiplexer 66 (over bus 127); the circuits which monitors the multiplexer 90 (over bus 142) as stated in the foregoing paragraph, the demultiplexer 99 (over bus 146) and, in a preferential arrangement, the conference bridge 110 (over bus 144), as indicated in FIG. 2, are substantially similar to the one represented in FIG. 8 and are not therefore described in details.

The messages generated from the CPU of $M_1$ such as $M_2$ for the monitoring of multiplexer 66 are written in the 256 cells of the memorey 801 and scanned by the address counter 802 which is fed by the CK clock. This circuit arrangement enables the handling of the selection units without engaging the CPU which operates only if and when it is necessary to define or cancel the connection between two subscribers.

When a subscriber requires a connection, the CPU sends the new message to the DATA input of the memory 801, which will be written in the memory cell associated to the time slot pertaining the subscriber and the address of such cell to the ADDRESS Input of SMC interface unit: when the comparing circuit 803 verifies the identity between the address generated from the file 802 and the ones sent from the CPU, allows the memory 801 to charge the message DATA in the cell found by this address.

At the end of a conversation, through a procedure similar to that above described, the CPU cancels the message written in the memory cell. A formal control is carried out on all the messages exchanged among either the internal SMC units or the external units (such as CPU, multiplexer 66, etc.): possible mistakes are stored in registers (not specifically represented in FIG. 8); in particular the address of faulty or not reliable memory cells, and for this reason no longer useful for the realization of a connection between two subscribers, is stored in an adeguate register.

All alarm signals sent from alarm registers located in the module 12, such as the circuits for the control of the parity bits of digital signals that the units of a module exchange among themselves or inside the same module, are sent to the TCNT interface unit (FIG. 6).

All fault alarms and other information about the module 12 circuits conditions (for example, synchronism loss between the module clock and the clock installed in the incoming PCM systems) are "concentrated" in one or more condition registers: the reading of such registers will enable the CPU of the master microprocessor ($M_1$ such as $M_2$) to know everything about the module 12 condition and to operate, if necessary and available, control tests and programs fit to disconnect the faulty device.

In the following text you find the main features of the resident software in each of the two microprocessors $M_1$ and $M_2$ which build up the control unit 120 (hereinafter individually indicated as MCP-Module Controller processor).

The software program of MCP can be divided into:
an operating system (MCPOS) which monitors the MCP activities both in connection to the other elements of the module 12 and in the exchange of information with the other MCP unit (as known, the control unit 120 is made up of two identical processors which work according to the master-slave principle);
a plurality of applicative programs, handled by the operating system (MCPOS), which process messages coming from the interface circuits (FIG. 2; 151-158), for example, and which generate messages addressed to the other MCP unit, to the operating system, to the switching devices (66,90,98 of FIG. 2), etc.

Figure 9:
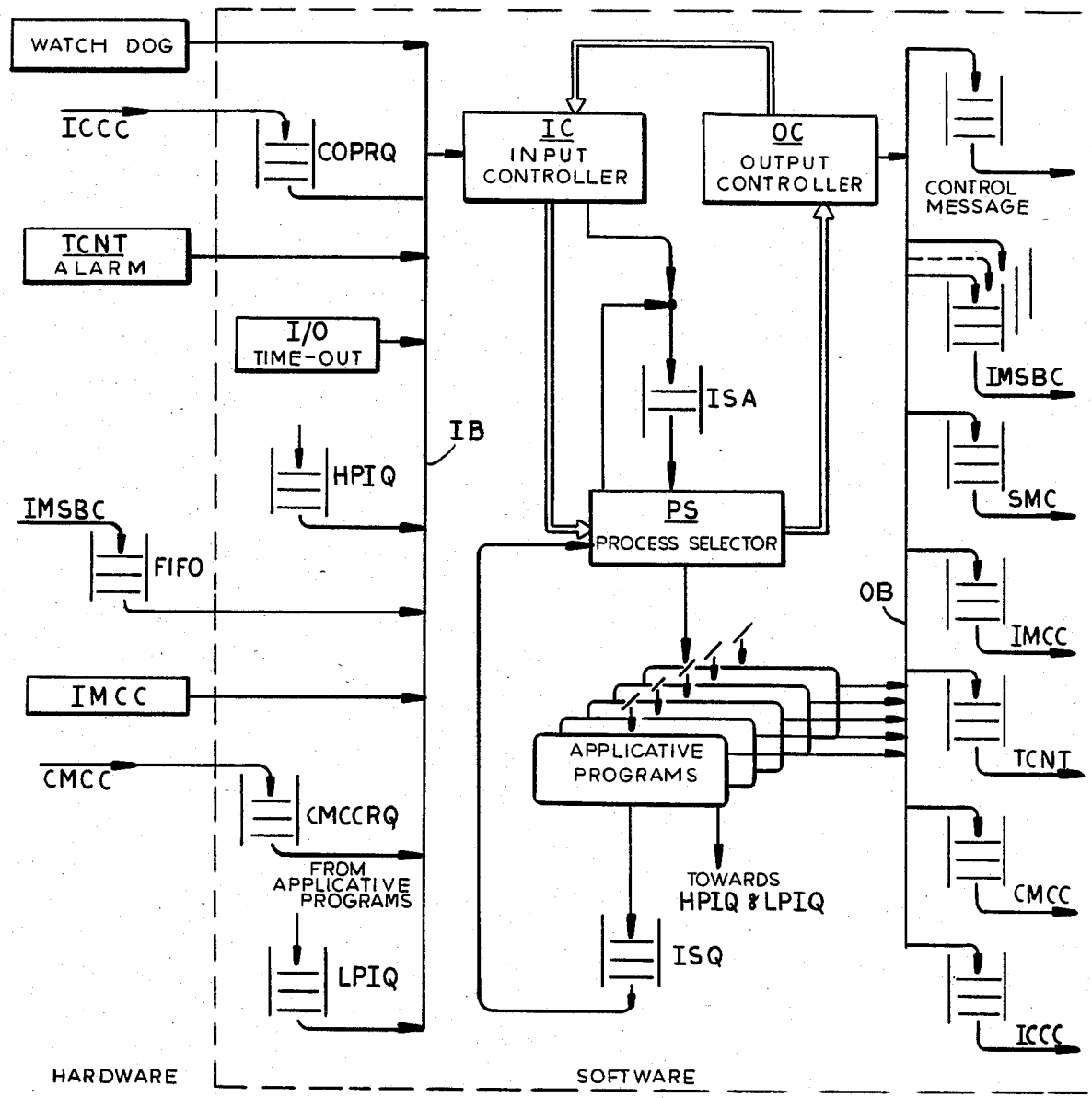
FIGS. 9 to 12 are flow-charts of the software programs of the control unit 120 of FIGS. 2 and 6.

FIG. 9 shows the software resident in the MCP; a glossary of the terms is enclosed (TAB I).

TABLE I

| | Glossary of the Terms |
|---|---|
| ccq | Output Queue for connection with DLC |
| CMCC | Central/Module Communications Controller |
| cmccrq | Receiving Queue from ES |
| cmccxq | Output Queue to ES |
| cmdq | Output Queue for Control Messages |
| CMG | Configuration Manager |
| coprq | Coprocessor Queue |
| copxq | Coprocessor Connection Queue |
| DLC | Digital Line Cards |
| ES | Support Processor |
| HPIQ | High Priority Internal Queue |
| IC | Input Controller |
| ICCC | Inter-Central Communication Controller |
| IMCC | Inter-Module Communication Controller |
| imccq | Output Queue for connection to other modules |
| IMSBC | Intramodule Serial Bus Controller |
| ISA | Input Signal Area |
| ISQ | Internal Signal Queue |
| LPIQ | Low Priority Internal Queue |
| MCP | Module Control Processor |
| MCPOS | Module Control Processor Operating System |
| OC | Output Controller |
| SMC | Switching Memories Controller |
| smcq | Output Queue for PCM System |
| TCNT | Test Controller |
| tcq | Output Queue for connection to Test Controller |
| WD | Watch Dog |
| PS | Process Selector |

The messages coming from devices outside the MCP (for example, from the Inter-Module Communication Controller IMCC) or generated in the MCP unit (for example, by the applicative programs) reach directly or through FIFO (first input first output) memories, an input bus IB, from where they are taken by the programs (IC, PS, OC) which constitute the basic cycle of the operating system MCPOS: the process selector PS activates each time the applicative program requested.

The three software modules (IC, PS, OC) of the basic cycle are better specified in the following lines.

The applicative programs send messages to the process selector PS and to the other elements (ICCC, IMSBC, etc.) of the control unit 120: all these messages are stored in the FIFO memories and produce some queues that are eliminated before the software module actually activated (PS or OC) transfers the control to the subsequent software module (OC or IC).

"Watch Dog" WD of FIG. 9 means a circuit arrangement which controls if two processors, working according to the master-slave principle, operate in the right way. An example of such circuit arrangement is described in the German Patent Application No. DE-OS 3104927 which corresponds to the U.S. application Ser. No. 233.159 of Feb. 10, 1981 now abandoned.

We supply now a detailed description of the main activities of the software modules IC, PS, OC of the basic cycle of the operating system MCPOS. We will use flow charts for a better explanation of each section.

Figure 10:
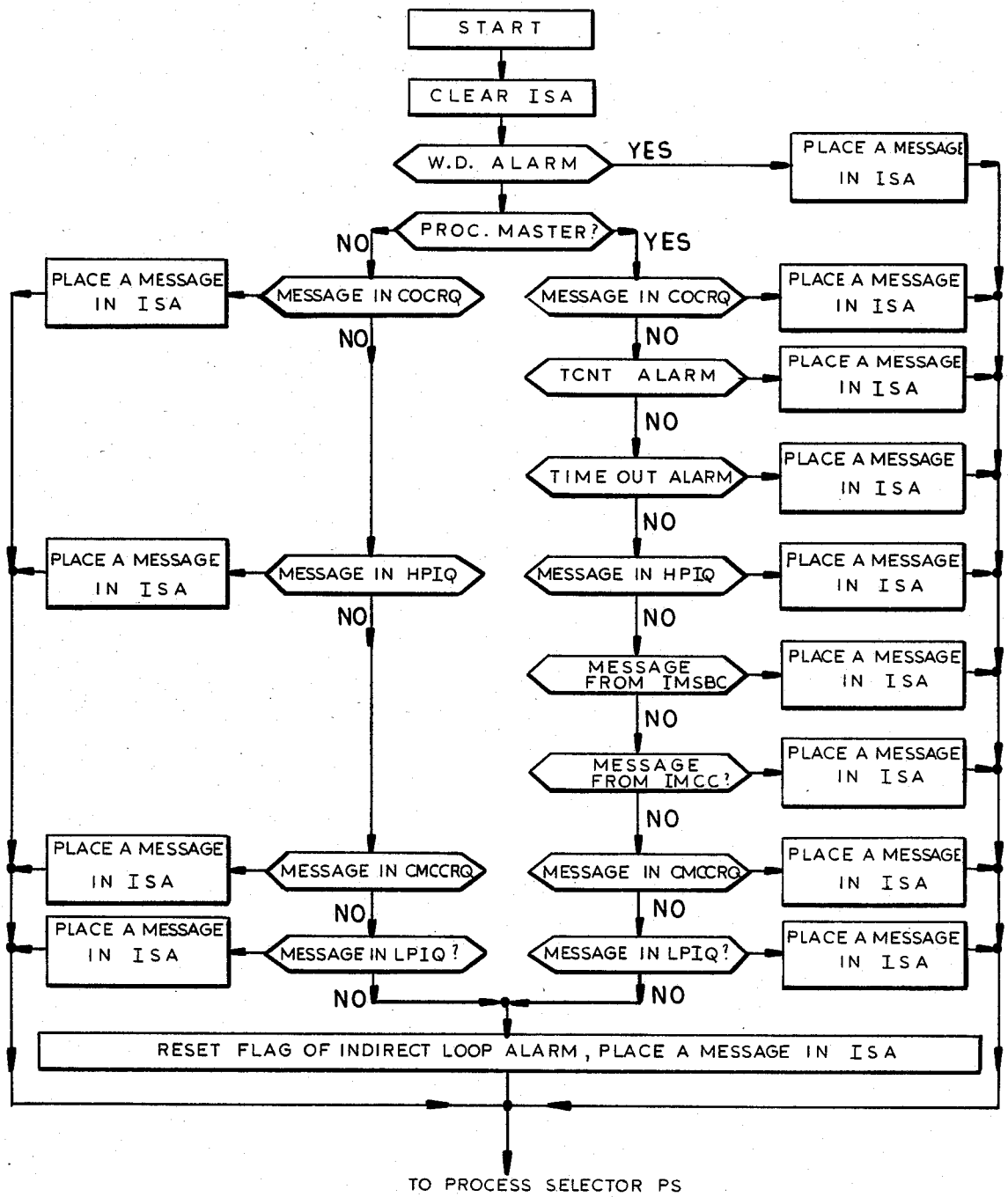
Figure 11:
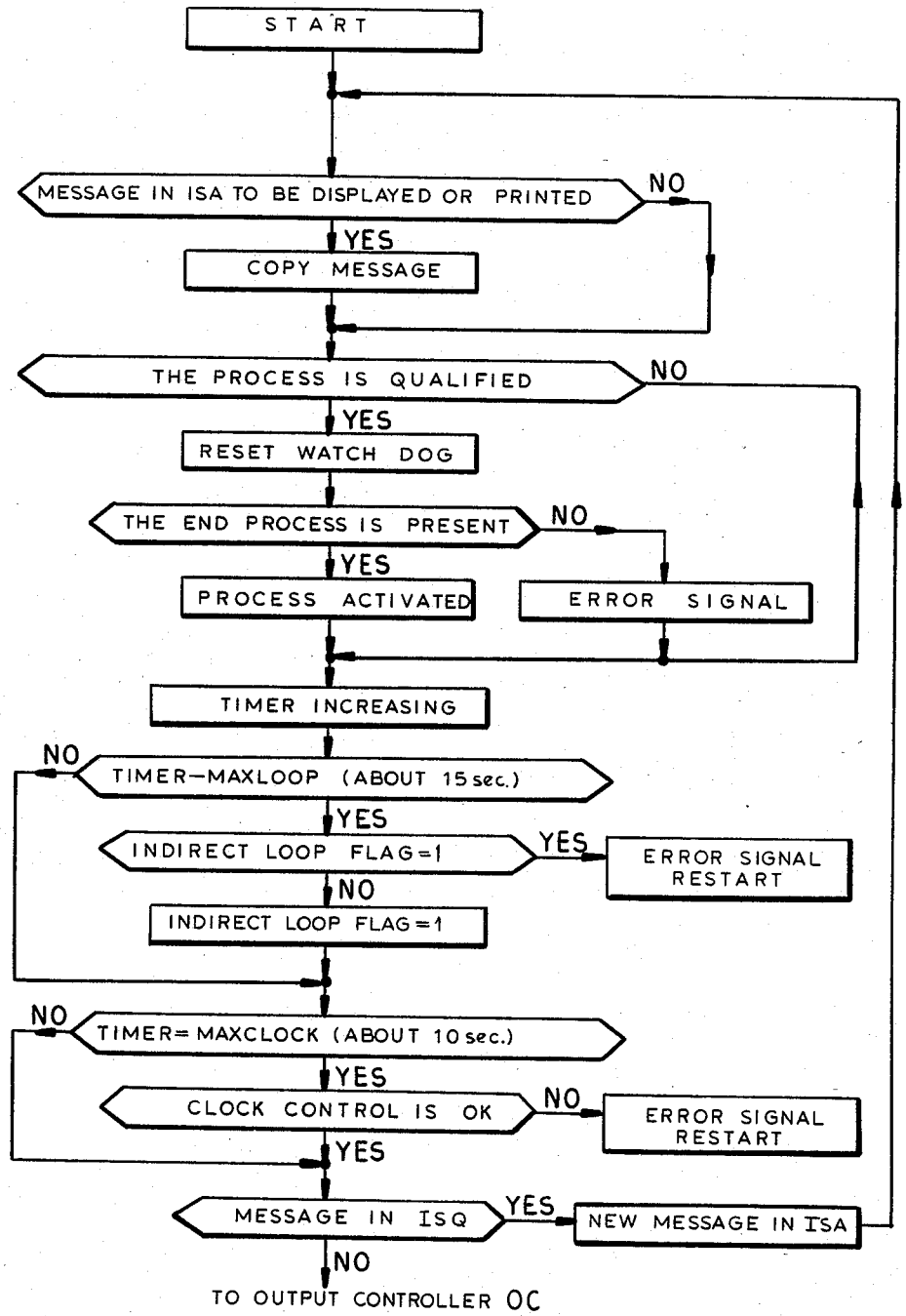

In FIG. 10 is indicated the flow-chart of the main operations of Input Controller IC controlled by MCPOS system: such operations are the following ones:
erasing the contents of the Internal Signal Area (ISA): in this memory area the IC stores the message taken from the input queues and then supplies it to the Process Selector PS; the result of such supply handling will be in any case a message stored in ISA;

checking the existence of an alarm signal of Watch Dog sent by the coprocessor (M1 or M2): if the processor finds the coprocessor alerted, creates a message and sends it to an applicative program, which performs different actions depending from the condition of the slave unit, alerted or not;

if the Watch Dog does not send alarm signals, the processor (M1 or M2) checks its own condition (master or slave). With this check it is possible to state which queues are to be explored, as the slave unit scans partially the queues. It is important to say that there is not time synchronization between the IC of the master unit and the IC of the slave unit, as both the processors perform the input scanning, like any other action, in different times (it may happen that both the processors of the control unit 120 carry out the same instruction at the same time, but this is a borderline case).

check of the message queue of the coprocessor (coprq); if there is a message, this is placed in ISA area and then IC passes the control to the process selector PS. Each processor (both when operating as master and when operating as slave) controls their own message queues coming from the coprocessor, if the copqr queue is free, the master unit controls if messages are coming from the Test Controller (TCNT); in this case a message is left in ISA area and the control is transferred to PS unit. The TCNT is not controlled by the slave unit, as in the case of parallel operation of the Module Controller the slave unit does not see the peripheral units which are handled in polling, if there are no messages from TCNT, the master unit controls if there are Time-Out alarm signals, that are actuated when the action requested is not promoted after some efforts. If such a message is found, a new message is created (to be sent to a diagnosis program) and placed in ISA area: the control is passed to PS. The slave unit does not effect such a control, if no alarm signals of Time-Out are present, a check on the high priority internal messages queue (HIPG) is done; here are the messages sent from applicative programs to other applicative programs of the same Module; in this case these messages regard the switching system. This queue is controlled by the master and by the slave processor. If there is a message, it is placed in ISA and the control transferred to the Process Selector;

if HIPQ is free, a check is done on the messages coming from the line interface circuit IMSBC; when a message is found, it is placed in ISA and the control is transferred to PS. As it regards a peripheral unit, such an action is not performed by the slave unit;

if no messages are coming from IMSBC, a check is done on the existence of messages coming from other modules (IMCC). As it regards a peripheral unit, such an action is not performed by the slave unit;

if no messages are coming from IMCC, a check is done on the receiving queue from the ES processor (cmccqr); if a message is found, this is placed in ISA and the control is passed as usual to the PS unit. To be taken into consideration, that even if some messages are placed in the queue, only one message at a time is processed and it is the oldest ones, e.g. the message that has been waiting for longer time (First In First Out principle). The queue from ES is controlled by the slave unit too;

If even the queue from ES is free, a check is done on the low priority internal queue (LPIQ), on which all the internal messages pertaining to the handling of the cyclic and basic control are placed. If a message at least is found, it is placed in ISA and the control is then transferred to PS unit. This queue is controlled by the master and by the slave units;

once reached this situation, it means that no messages have been received: in this case the IC circuit is left and the control is transferred to the Process Selector (Procsel) that allows the performance of the process to which the ISA messagge is sent. The Procsel (FIG. 11) allows the execution of the program to which the ISA message must be sent. Procsel receives the control from the input controller IC and then transfers it to the Output Controller OC once it has emptied the internal queue of all messages ISQ generated by the applicative programs and has activated the relative applicative programs.

Procsel starts its operation by checking that the message placed in ISA fulfills any requests of display or printing and then by reproducing the messages in an appropriate buffer unit, if the answer is affirmative one.

The subsequent action of an applicative program is preceded by a first check on its condition: if it is qualified, the Watch Dog is reset, a check is done on the presence of the operative program in the operating system and as last operation the control of CPU is transferred to the pertaining applicative program. An applicative program can even be absent in the system in the case, for example, of a reduced configuration that does not require the applicative program actually excluded.

When the applicative program in action returns the control to Procsel, the meter MAXLOOP is increased for the timing of some periodic tests carried out to determine the presence of an indirect loop (the applicative program always follows the same instructions sequence) and the correct clock movement (MAXCLOCK).

Before the control is transferred to the Output Controller OC, a check is done on the presence of other messages placed in ISQ; if messages are found, the first message of this queue is placed in ISA and the cycle is repeated from the beginning.

Figure 12:
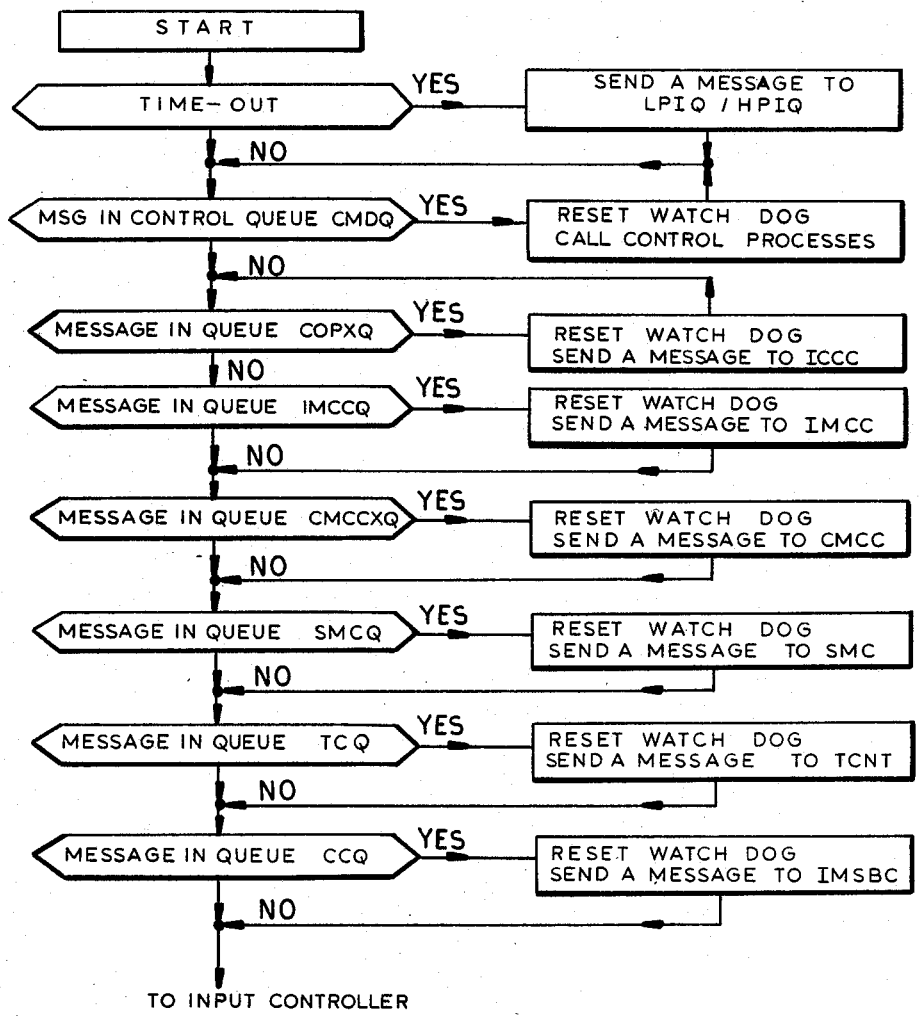

When the Output Controller OC (FIG. 12) is called, a first check (TIME OUT) is done on the synchronisation of all the timing devices, verifying for everyone if it is necessary or not the sending of a time-out message to the interested applicative program: if the applicative program is not completed in the prescribed time, it means that there is probably an indirect loop.

The control is then transferred to the routine that arranges the checking of the queues and the forwarding of their messages.

The check is done on all the output queues and from every queue a message at least is sent. At first, all the messages are sent from the coprocessor queue (copxq) and from the control queue (cmdq); later the messages, if any, stored in the output queue, are sent each at time to the relevant interface circuits IMCC, CMCC, SMC, TCNT, IMSBC. The call to a controller and the sending of a message are preceded by a reset of the watch dog to avoid too long waiting loop.

I am now describing briefly the working of my modular switching network; messages come from and are sent to the control unit 120 over the aforesaid interface circuit SMC, TCNT, IMSBC, CMCC, IMCC and are processed by the above mentioned software modules.

Upon detecting an off-hook condition (seizure) in a line connected to an input/output terminal, the sensing circuit x of the respective port 201–208 emits an identification signal toward control unit 120 through the logic circuit y of the associated transcoder and via buffer circuit 333, this identification signal coding the identity of the calling subscriber station. In response to the identification signal, the control unit 120 assigns to the calling station a first channel in the PCM frame carried by multiple 68 (FIG. 2) and a second channel in the PCM frame carried by multiple 92, these channels corresponding to respective phases in the operating cycle of switching module 12a. Control unit 120 then enables the emission of a dial tone to the calling station. Preferably, the dial tone is generated by a circuit incorporated in expander 98 and is selectively transmittable to all the transcoders in interfaces 151–158 in response to commands generated by control unit 120 on bus 146.

If the calling station is equipped with a pushbutton digit selector, control unit 120 also assigns to it a multifrequency digit transceiver and a phase through which a voice path is established between the subscriber line and the transceiver.

Upon the reception of digit-selection signals from the calling station, the corresponding interface (e.g. 151) halts the transmission of the dial tone. With pushbutton selection the multifrequency digit transceiver is not released until dialing is completed.

Sensing circuits x of interface section 200 monitor the incoming digit-selection signals and transmit them in coded form to control unit 120 via logic circuits y and buffer circuit 333. Upon the reception of all the selected digits, control unit 120 identifies the switching module 12a–12f associated with the called subscriber station and transmits a connection request to the identified module via bus 128 (see FIG. 2), one of the junctors 74a–74f and an outgoing multiple 50a, 16' ... 24'. Upon receiving the connection request via one of junctors 80a–80f, one of data stores 81a–81f, concentrator 90 and connection 141, the control unit 120 of the module linked to the called subscriber station identifies the same and assigns thereto a first channel in the incoming PCM frame carried by multiple 92 and a second channel in the outgoing PCM frame carried by multiple 68 of this module, provided the called subscriber station is available for a call connection. Upon assigning such transmission channels, control unit 120 of the receiving module emits a signal over bus 122 to the interface connected to the called station, enabling the emission of a ringing signal thereto.

The control unit of the receiving module notifies the control unit of the transmitting module (if different therefrom) that the called subscriber is available, whereupon the latter control unit induces the emission of a ringing tone to the calling subscriber. Upon seizure of the line by the called subscriber, the control units involved terminate the emission of the aforementioned signals to the called and the calling subscriber. The described procedure is similar when the peripheral unit requesting the connection is a trunk line.

During a conference call, control unit 120 of each involved routing module 12 instructs its bridge 110 to temporarily memorize data signals appearing in several channels in the outgoing PCM frame carried by multiple 92. Bridge 110 algebraically sums the data signals received during any given operating cycle and transmit the resulting digital sample to expander 98 via connection 114 for loading into a write-activated register associated with each subscriber station participating in the conference call.

In a telecommunication system according to my present invention, memory and control functions are distributed throughout the switching network. The modular design facilitates the expansion of the system to accomodate increased consumer demand. The system is versatile in its capacity for handling analog as well as digital signaling from various types of peripheral units as noted above. For improved reliability, components may be duplicated to provide a certain redundancy as is well known in the art.

I claim:

1. A modular switching unit network adapted to facilitate selective message transmission among a multiplicity of peripheral units of a telecommunication system, comprising:

a plurality of signal-routing modules each having a set of input/output terminals divided into a plurality of subsets and connected to respective peripheral units of a group of such units divided into a plurality of subgroups, said peripheral units being individually associated with each module;

a control unit in each module;

a plurality of interfaces in each module each connected to a plurality of peripheral units in a respective subgroup of the associated group via corresponding subsets of said set of terminals;

first register means in each of said interfaces for temporarily storing incoming m-bit data words representing message samples of PCM channels received from the associated subgroup of peripheral units in respective time slots of an operating cycle coinciding with a recurrent PCM frame divided into a multiplicity of phases, each of said time slots accommodating a PCM frame and encompassing m phases;

first channel-concentrating means in each module with first input connections to said first register means of all said interfaces and with a number of first output less than the number of said first input connections carrying in each phase the bits of an incoming data word extracted from said first register means in response to instructions from each control unit;

second register means in each module with inputs connected to said first outputs of all said modules for temporarily storing the data words carried thereon in each phase;

second channel-concentrating means in each module with input connections to said second register means and with a number of second outputs less than the number of said second input connections carrying in each phase the bits of an outgoing data word extracted from said second register means in response to instructions from said control unit;

third register means in each of said interfaces for temporarily storing outgoing data words destined for peripheral units in the associated subgroup; and distributing means in each module inserted between said second channel-concentrating means and said interfaces for selectively feeding outgoing data words from said second outputs to said third register means in response to instructions from said control unit, said third register means being responsive to instructions from said control unit for directing message samples corresponding to the stored outgoing data words in successive time slots to designated peripheral units of the associated subgroup, said distributing means including channel-expanding means and a plurality of data stores with output connections to said third register means in respective interfaces, said channel-expanding means entering outgoing data words destined for any of said interfaces in the corresponding data stores.

2. A network as defined in claim 1 wherein each of said interfaces further includes transcoding means inserted between said input/output terminals and said first register means for converting analog message samples into digital data words and vice versa.

3. A network as defined in claim 1 or 2 wherein said first register means includes conversion means for supplementing each incoming m-bit data word with additional bits constituting a corrective code and for reading out the resulting bit combination in parallel to said first channel-concentrating means.

4. A network as defined in claim 1 or 2 wherein each of said register means comprises a multiplicity of register pairs, the registers of each pair being alternately enabled by said control unit for the reception of data words to be stored and for the emission of the data words so stored.

5. A network as defined in claim 1 or 2 wherein the number of said input/output terminals in each subset is at most equal to the number of phases in each PCM frame.

6. A network as defined in claim 1 or 2 wherein each module further includes a conference bridge addressable by said second outputs under instructions from said control unit for emitting the algebraic sum of data words from several channels, extracted from said second register means during a given operating cycle, to said distributing means.

7. A network as defined in claim 1 or 2, wherein said data stores include conversion means for reading out each m-bit data word in series, corrected according to the associated additional bit.

* * * * *